United States Patent
Krause et al.

(10) Patent No.: US 8,413,940 B2
(45) Date of Patent: Apr. 9, 2013

(54) HOLDING DEVICE FOR AN ADD-ON PART OF A MOTOR VEHICLE

(75) Inventors: Michael Krause, Albershausen (DE); Arthur Wieland, Wolfschlugen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 636 days.

(21) Appl. No.: 12/468,210

(22) Filed: May 19, 2009

(65) Prior Publication Data

US 2009/0302179 A1    Dec. 10, 2009

(30) Foreign Application Priority Data

Jun. 6, 2008 (DE) .......................... 10 2008 027 291

(51) Int. Cl.
- *A47B 96/06* (2006.01)
- *E04G 3/00* (2006.01)
- *F16B 1/00* (2006.01)
- *G09F 7/18* (2006.01)

(52) U.S. Cl. ............ 248/229.2; 248/223.41; 248/222.13

(58) Field of Classification Search ............ 248/220.22, 248/225.21, 313, 316.1, 220.21, 220.31, 248/220.41, 220.43, 221.11, 221.12, 222.11, 248/222.12, 222.13, 223.41, 224.51, 226.11, 248/229.2, 503.1; *B60K 15/067, 15/03; B60P 1/00; B60R 9/00*

See application file for complete search history.

(56) References Cited

U.S. PATENT DOCUMENTS

| | | | | |
|---|---|---|---|---|
| 1,788,464 A * | 1/1931 | Kederis et al. | .......... | 248/224.51 |
| 2,482,885 A | 9/1949 | Turner | | |
| 3,753,543 A * | 8/1973 | Burrell et al. | .................. | 248/313 |
| 3,945,544 A * | 3/1976 | Walker et al. | .................. | 224/431 |
| 4,848,714 A * | 7/1989 | Ziaylek et al. | ................ | 248/313 |
| 5,114,297 A * | 5/1992 | Kirchhoff | ...................... | 414/622 |
| 5,169,195 A | 12/1992 | Kirchhoff | | |
| 5,193,262 A * | 3/1993 | Hyde et al. | ...................... | 29/447 |
| 7,661,640 B2 * | 2/2010 | Persson | .................... | 248/225.11 |

FOREIGN PATENT DOCUMENTS

| | | |
|---|---|---|
| AT | 10 843 U1 | 11/2009 |
| DE | 3902177 | 6/1990 |
| DE | 10328456 | 1/2005 |
| DE | 60110331 | 2/2006 |
| DE | 2020060000667 | 3/2006 |
| DE | 60116910 | 9/2006 |
| DE | 102006021710 A1 | 11/2007 |
| EP | 1 182 079 A2 | 2/2002 |
| WO | WO 2004/113110 A1 | 12/2004 |

* cited by examiner

*Primary Examiner* — Nkeisha Smith
(74) *Attorney, Agent, or Firm* — McGlew and Tuttle, P.C.

(57) ABSTRACT

A holding device fastening a part (1) to a frame (3). The holding device has an upper bracket (5) fastened to the frame (3), a lower bracket (6) fastened to the frame (3) below the upper bracket (5), and a holder (7) fastened to the part (1). The holder (7) has a hook (13) and a fixing plate (14). The upper bracket (5) has a hook mount (15) shaped complementary to the hook (13). The hook (13) is hung in the hook mount (15). The lower bracket (6) has a plate mount (16), shaped complementary to the fixing plate (14). The fixing plate (14) is inserted into plate mount (16) the from the top. A positive-locking connection is formed between the plate mount (16) and the fixing plate (14), which secures the fixing plate (14) at right angles to an insertion direction.

16 Claims, 4 Drawing Sheets

HOLDING DEVICE FOR AN ADD-ON PART OF A MOTOR VEHICLE

CROSS REFERENCE TO RELATED APPLICATIONS

This application claims the benefit of priority under 35 U.S.C. § 119 of German Patent Application 10 2008 027 291.4 filed Jun. 6, 2008, the entire contents of which are incorporated herein by reference.

FIELD OF THE INVENTION

The present invention pertains to a holding device for fastening an add-on part on a support frame of a vehicle, especially a utility vehicle.

BACKGROUND OF THE INVENTION

It is necessary in vehicles, especially in utility vehicles, to fasten a plurality of different add-on parts to a support frame of the vehicle. Typical add-on parts are exhaust gas treatment means, for example, exhaust mufflers, catalytic converters, particle filters as well as modules with any desired combination of such means. Individual fastening solutions have hitherto been used to make it possible to fasten add-on parts of the same kind in different vehicles. This is associated with comparatively high costs.

SUMMARY OF THE INVENTION

The present invention pertains to the object of proposing an improved embodiment, which is characterized especially in that add-on parts of the same kind can be arranged on different vehicles at reduced costs, for fastening an add-on part to a vehicle support frame.

This object is accomplished according to the present invention with a holding device for fastening an add-on part to a support frame of a vehicle, especially a utility vehicle, with an upper bracket, which is fastened to the support frame in the mounted state of the holding device, with a lower bracket, which is fastened to the support frame below the upper bracket in the mounted state of the holding device and with a holder, which is fastened to the add-on part in the mounted state of the holding device. The holder has a hook. The upper bracket has a hook mount, which is shaped complementarily to the hook and into which the hook can be hung from the top. The holder has a fixing plate. The lower bracket has a plate mount, which is shaped complementarily to the fixing plate and into which the fixing plate can be inserted. A positive-locking connection, which secures the fixing plate at right angles to the direction of insertion in the plate mount, is formed between the plate mount and the fixing plate inserted into it.

The present invention is based on the general idea of providing a holding device, which has support frame-side holding elements and add-on part-side holding elements, which can be fixed to one another via a defined interface in a simple manner, on the one hand, and can be fastened to the vehicle and to the add-on part in different positions, on the other hand, for fastening an add-on part to a support frame of a vehicle. Adaptation to different vehicles can thus be made by an individually adapted mounting of the support frame-side holding elements, and a corresponding adaptation can also be performed on the side of the add-on part-side holding elements. The add-on part-side holding elements with the add-on part attached thereto can then be arranged via the interface at the support frame and at the support frame-side holding elements fastened thereto. The same holding device can always be used for fastening the add-on parts to the support frame for different combinations of add-on parts and support frames due to the holding device proposed. The costs for fastening the add-on part can be reduced as a result.

Such a holding device comprises according to the present invention an upper bracket as support frame-side holding elements, which is fastened to the support frame in the mounted state of the holding device, as well as a lower bracket, which is fastened to the support frame below the upper bracket in the mounted state. At least the upper bracket is equipped with a hook mount, into which a hook can be hung from the top. At least the lower bracket is equipped with a plate mount, into which a fixing plate can be inserted from the top. The add-on part-side holding elements comprise a holder, which is fastened to the add-on part in the mounted state and has a hook fitting the hook mount of the upper bracket as well as a fixing plate fitting the plate mount of the lower bracket. Together with the hook and the fixing plate of the holder, the hook mount and the plate mount of the brackets form an interface, which fixes the holder with the add-on part arranged thereon at the brackets and hence at the support frame equipped with the brackets in a positive-locking manner. Due to the use of two separate brackets, which can be fastened to the support frame variably in respect to their distance, they can be fastened to support frames having different dimensions in an especially simple manner. At the same time, positive-locking fixation of the add-on part to the support frame can always be embodied by means of the hook and the fixing plate of the hook.

Corresponding to an advantageous embodiment, the hook may have a plate section at an end facing the upper bracket, the upper bracket having, on a side of the hook mount facing away from the holder, a plate mount, which has a shape complementary to that of the plate section, and into which the plate section can be inserted from the top. The hook, plate section, hook mount and plate mount are coordinated with one another here such that when the hook is hung into the hook mount, the plate section is at the same time inserted into the plate mount, and a positive-locking connection develops between the plate mount and the plate section inserted into it, which said positive-locking connection secures the plate section at right angles to the direction of insertion in the plate mount. The positive-locking fixation of the holder to the upper bracket can be improved in this manner.

According to an especially advantageous variant, the fixing plate and the plate section may be essentially of a congruent shape. As a consequence, the plate mounts of the upper bracket and of the lower bracket, which are complementary to the fixing plate and to the plate section, respectively, are correspondingly congruent. This mode of construction makes it possible, in particular, to design the two brackets as brackets of identical design, which reduces the manufacturing costs for the brackets and hence for the holding device.

Other important features and advantages of the present invention appear from the subclaims, from the drawings and from the corresponding description of the figures on the basis of the drawings.

It is obvious that the above-mentioned features, which will still be explained below, can be used not only in the particular combination described, but in other combinations or alone as well without going beyond the scope of the present invention.

Preferred exemplary embodiments of the present invention are shown in the drawings and will be explained in more detail below, identical reference numbers referring to identical or similar or functionally identical components.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
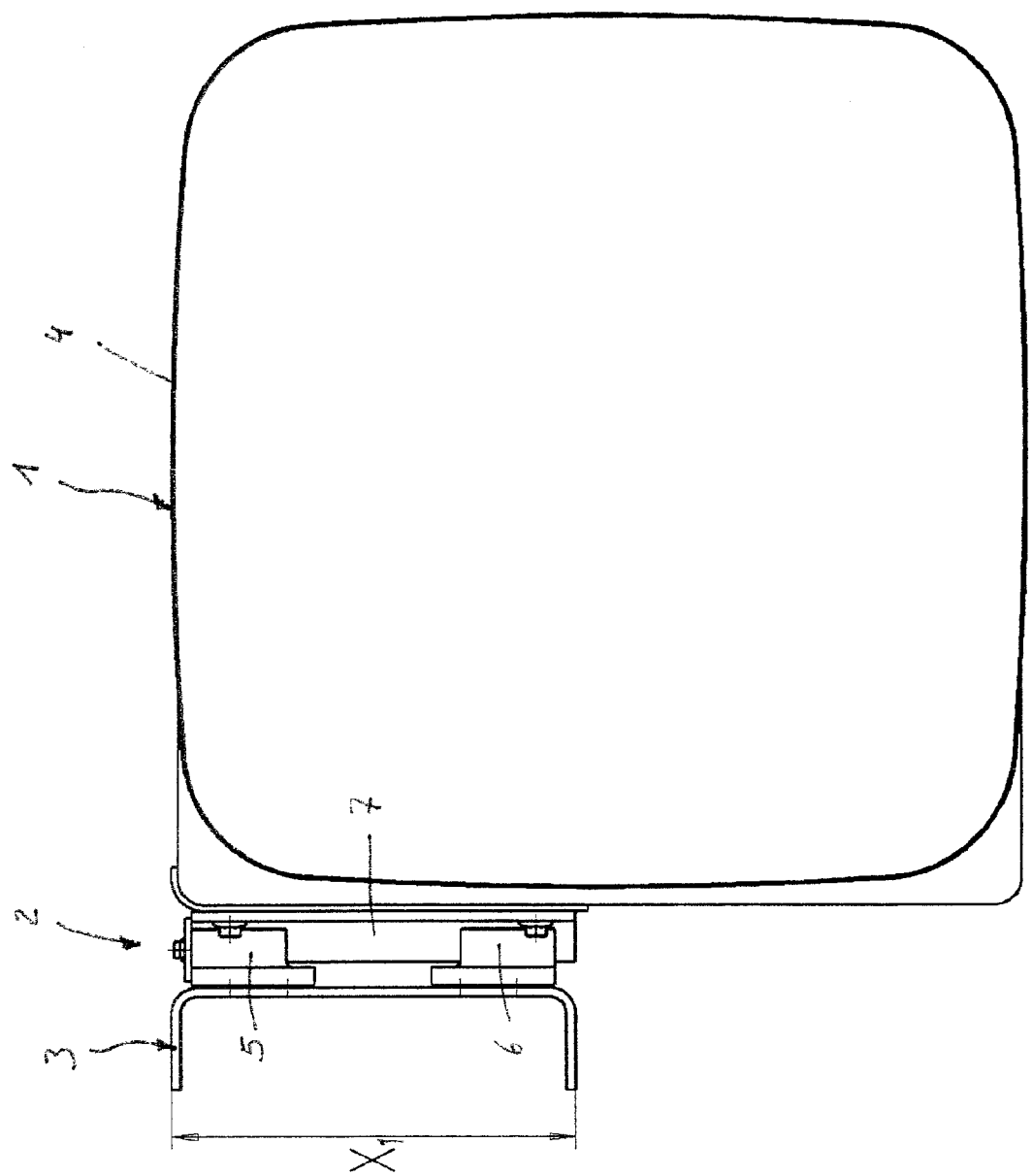
FIG. 1 is a greatly simplified, partially cut-away view of a motor vehicle with an add-on part fastened thereto.
Figure 2:
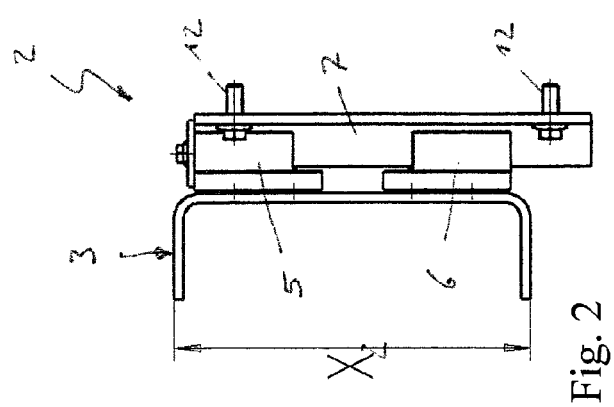
FIG. 2 is a view as in FIG. 1, but in the area of a holding device, showing a different position of the brackets for a different support frame embodiment.
Figure 3:
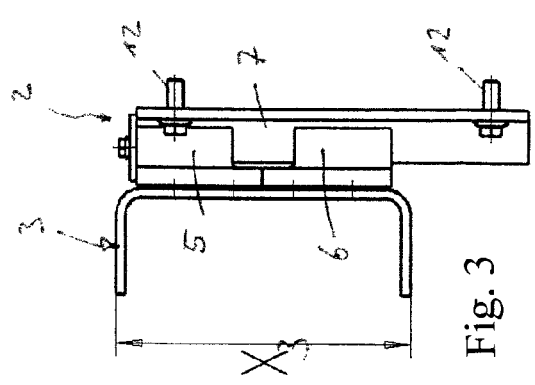
FIG. 3 is a view as in FIG. 1, but in the area of a holding device, showing a different position of the brackets for a different support frame embodiment.

Referring to the drawings in particular, corresponding to FIG. 1, an add-on part 1 can be fastened to a support frame 3 of a vehicle, not shown otherwise, by means of a holding device 2. The add-on part 1 is, for example, a fuel tank or an exhaust gas treatment means. For example, the add-on part 1 contains in a housing 4 at least one exhaust muffler or at least one catalytic convertor element or at least one particle filter element or any desired combination of the above-mentioned components. In particular, complex exhaust gas treatment modules are conceivable, which comprise, for example, an injection means for a reducing agent or for fuel in conjunction with other exhaust gas treatment elements. The vehicle is preferably a utility vehicle. The support frame 3 may have different heights $X_1$, $X_2$, $X_3$ in different utility vehicles corresponding to FIGS. 1-3. The holding device 2 can be adapted to these different heights X in a simple manner. It is clear that a plurality of such holding device 2 may also be used to fasten the add-on part 1 to the support frame 3.

Corresponding to FIGS. 1-11, the holding device 2 comprises an upper bracket 5, a lower bracket 6 as well as a holder 7. The upper bracket 5 is fastened to the support frame 3 in the mounted state of the holding device 2. The upper bracket 5 has, for example, a bracket plate 8 for this, which contains screw holes 9, which make it possible to screw the upper bracket to the support frame 3. The lower bracket 6 is likewise fastened to the support frame 3 in the mounted state of the holding device 2, namely, vertically below the upper bracket 5. The lower bracket 6 may advantageously also be equipped with a bracket plate 8 for this, which contains screw holes 9, through which the fastening screws can be passed in order to bring about a screw connection between the lower bracket 6 and the support frame 3. Holder 7 is fastened to the add-on part 1 in the mounted state of the holding device 2. Holder 7 may have for this purpose a holding plate 10, which is equipped with a plurality of screw holes 11, which make it possible to screw the holder 7 to the add-on part 1. Corresponding screws are designated by 12 in the figures. Holder 7 has a hook 13 as well as a fixing plate 14. A vertical distance is provided between the hook 13 and the fixing plate 14 in the example being shown.

The upper bracket 5 has a hook mount 15, which is shaped complementarily to the hook 13, such that hook 13 can be hung from the top into the hook mount 15. The lower bracket 6 has a plate mount 16, which is shaped complementarily to the fixing plate 14, such that the fixing plate 14 can be inserted into the plate mount 16 from the top. The fixing plate 14 and the plate mount 16 are coordinated with one another such that the fixing plate 14 inserted into the plate mount 16 is secured in the plate mount 16 by a positive-locking connection at right angles to the direction of insertion.

To facilitate attachment of holder 7 to the brackets 5, 6, hook 13 has a lead-in bevel 17. This is oriented such that it drives the hook 13 into the hook mount 15 against the upper bracket 5 during hanging into the hook mount 15. Complementary thereto, the hook mount 15 can be equipped with a ramp 18, which supports the functionality of the lead-in bevel.

In addition, hook 13 is equipped with a plate section 19 at an end facing the upper bracket 5 in the example being shown. In a complementary manner to this, the upper bracket 5 is equipped on a side of the hook mount 15 facing away from the holder 7 with a plate mount 20, which is shaped complementarily to the plate section 19, such that the plate section 19 can be inserted from the top into the plate mount 20. This plate mount 20 and the plate section 19 are coordinated with one another such that the plate section 19 inserted into the plate mount 20 is secured by a positive-locking connection at right angles to the direction of insertion in the plate mount 20. Corresponding to the preferred embodiment being shown here, the fixing plate 14 and the plate section 19 may be of a congruent shape. The plate mounts 16, 20 are correspondingly also congruent, especially of identical design. The two brackets 5, 6 are of an identical design in the special embodiment being shown here, i.e., the brackets 5, 6 are identical parts. The lower bracket 6 is preferably mounted on the support frame 3 rotated by 180° in relation to the upper bracket 5. Rotated mounting of the lower bracket 6 avoids incorrect mounting of holder 7, namely, an inadvertent hanging of hook 13 into the hook mount 15 of the lower bracket 6. The lower bracket 6 may, in principle, also be mounted in the same manner as the upper bracket 5 on the support frame 3 to embody the holding function for the fixing plate 14.

Holder 7 has a web 21. This web 21 extends vertically in the mounted state of the holding device 2. It joins downwardly the hook 13. It may preferably extend over the entire length of holder 7 or of the holding plate 10. Web 21 projects from the holding plate 10 on a side facing the brackets 5, 6. The fixing plate 14 is arranged at this web 21. Web 21 is dimensioned such that the fixing plate 14 projects over the web 21 at right angles to the longitudinal direction of said web 21 and thus makes possible a positive-locking connection with the respective plate mount 16. To make it possible to insert the fixing plate 14 into the plate mount 16 of the lower bracket 6 and to make it possible to hang hook 13 into the hook mount 15 of the upper bracket 5, the hook mount 15 and the plate mount 16 are equipped with a vertical slot 22 each, through which web 21 can be inserted or passed. Web 21 is, moreover, advantageously dimensioned such that the fixing plate 14 has the same distance from the holding plate 10 as the plate section 19.

The fixing plate 14 is fastened detachably to the holder 7, especially to the web 21 thereof, in the preferred embodiment being shown. Holder 7 is equipped for this with a plurality of fastening points 23, by means of which the fixing plate 14 can be fixed to the holder 7. These fastening points 23 have different distances from the hook 13, as a result of which different distances can be set between the hook 13 and the screw holes, through which fastening screws can be inserted up to the fixing plate 14 from a side facing the add-on part 1. These fastening points 23, especially the screw holes, are formed on the web 21 in the example.

A fixing plate, which is rigidly arranged at the holder 7 and which extends along the holder 7 at least along the distance area, along which the separate fixing plate 14 shown is adjustable, may be provided in another embodiment instead of a separate fixing plate 14, which can be fastened to the holder 7 at different distances from the hook 13. In particular, such a nonadjustable fixing plate may extend continuously from the hook 13 to the position with the maximum distance from the hook 13 of the separate fixing plate 14 shown here. The plate section 19 of hook 13 may pass directly over into the fixing plate 14 in an especially advantageous embodiment.

The fixing plate 14 and the plate section 19 are chamfered in the direction of insertion; a corresponding lead-in bevel is designated by 24.

Figure 5:
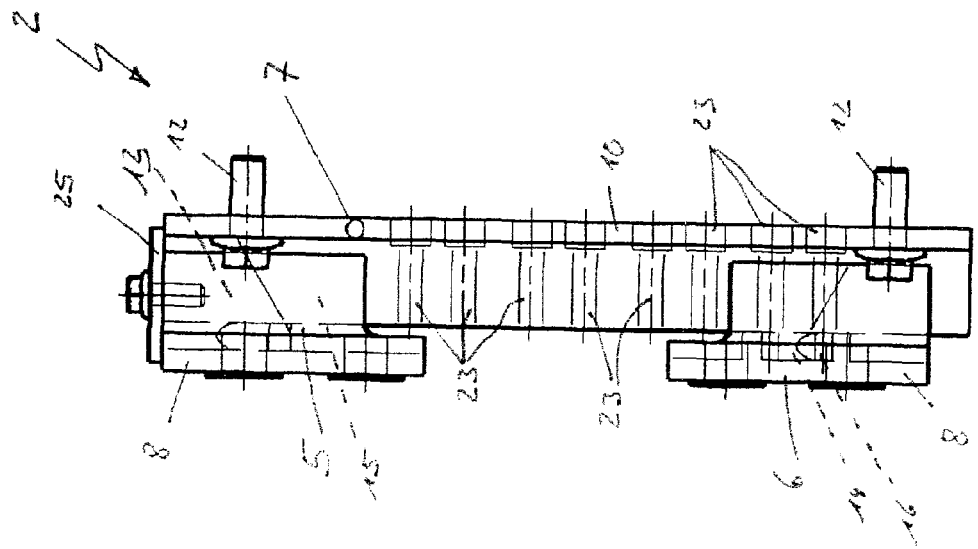
FIG. 5 is a side view of the holding device.
Figure 4:
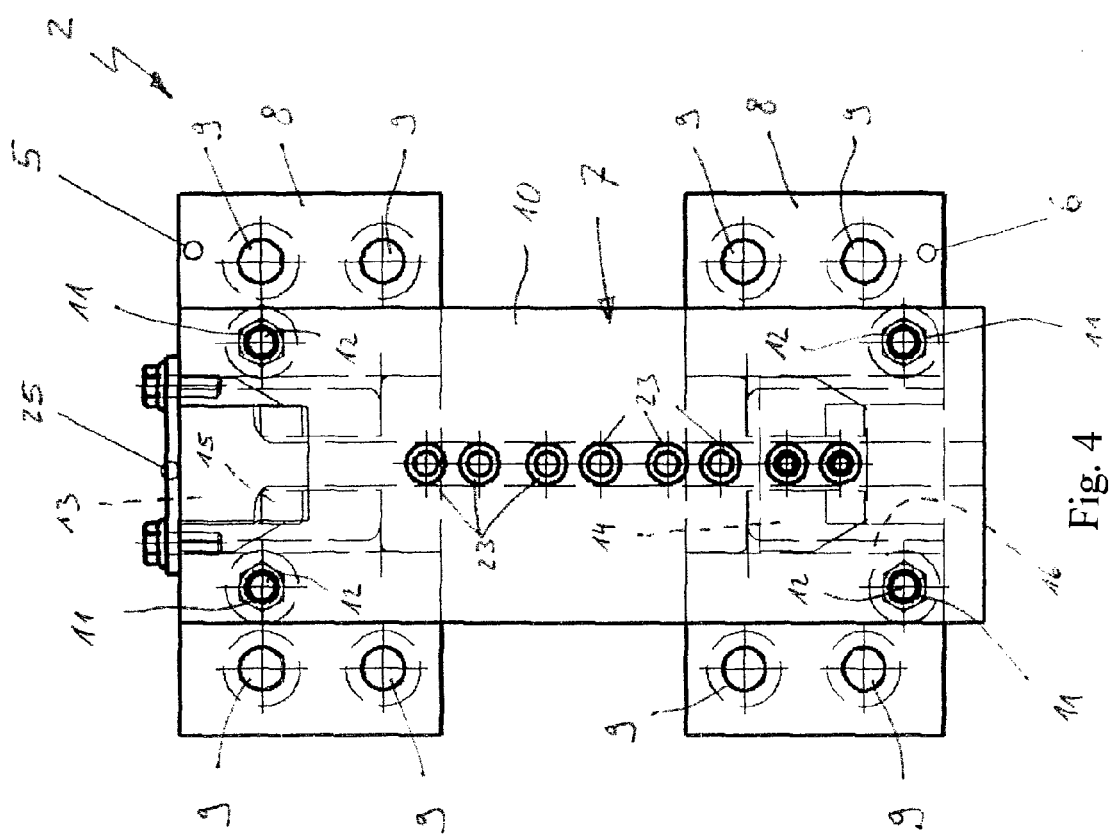
FIG. 4 is a front view of the holding device.
Figure 8:
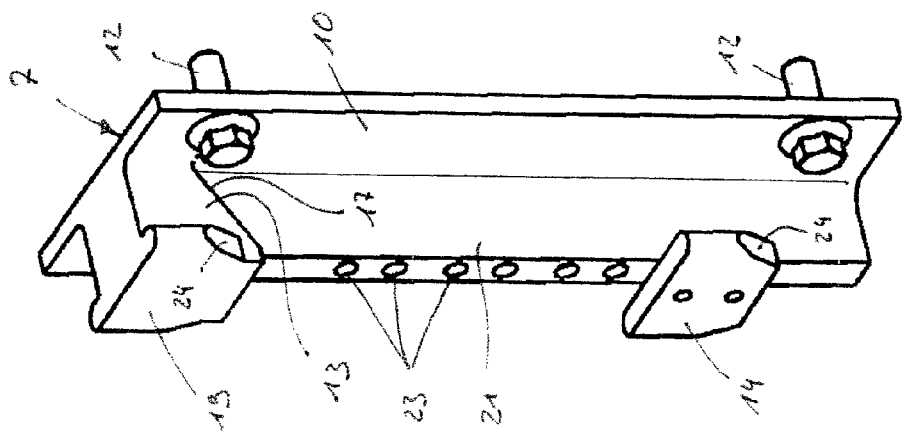
FIG. 8 is a perspective view of the holder.
Figure 7:
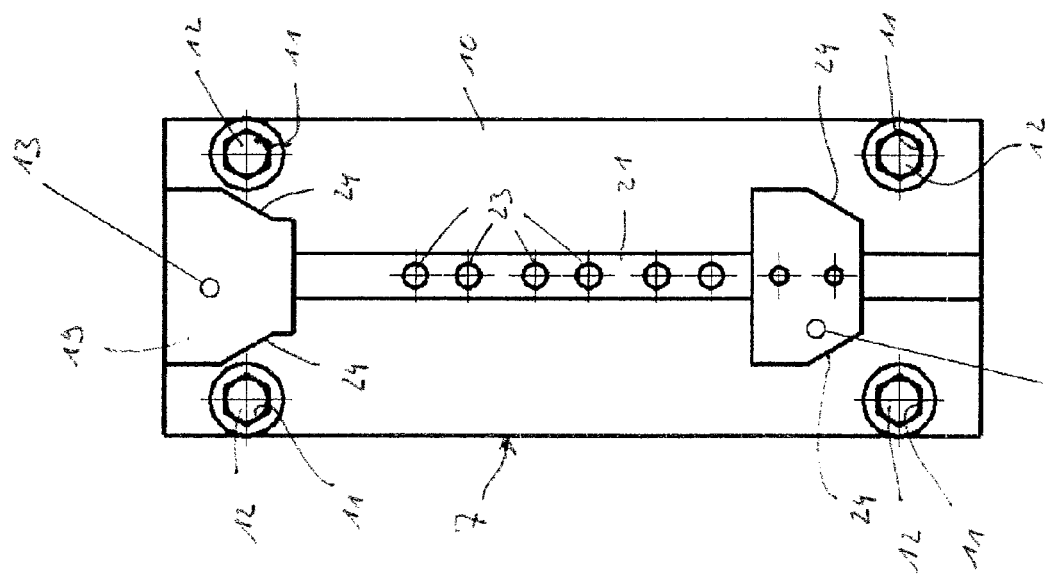
FIG. 7 is a front view of the holder.
Figure 6:
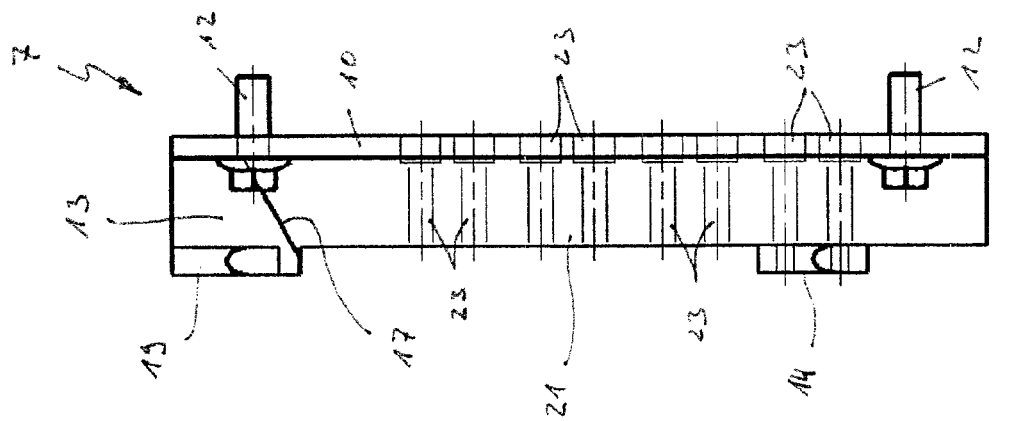
FIG. 6 is a side view of a holder.
Figure 10:
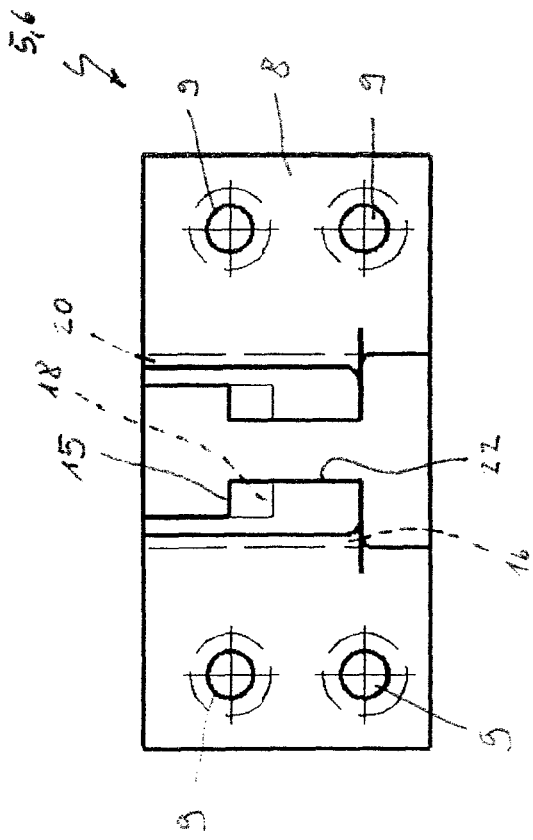
FIG. 10 is a front view of the bracket.
Figure 11:
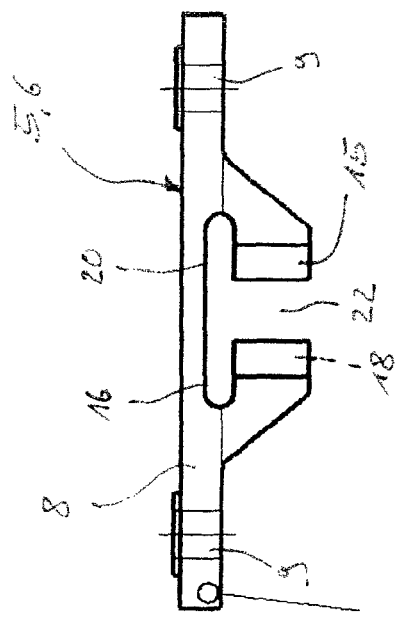
FIG. 11 is a top view of the bracket.
Figure 9:
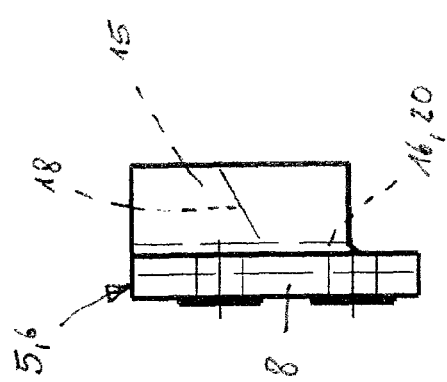
FIG. 9 is a side view of a bracket.

Corresponding to FIGS. 4 and 5, the holding device 2 comprises, besides, a securing plate 25, which is fastened to the upper bracket 5 in the area of the hook mount 15. The securing plate 25 extends over the hook 13 hung into the hook mount 15. The hook 13 is secured in the hook mount 15 in this manner. Especially advantageous is here an embodiment in which the hook mount 15, hook 13 and securing plate 25 are coordinated with one another such that the securing plate 25 fastened to the upper bracket 5 prestresses the hook 13 in the direction in which it is hung into the hook mount 15. Relative motions between the holder 7 and the upper bracket 5 and hence relative motions between the add-on part 1 and the support frame 3 during the operation of the vehicle can be avoided as a result.

While specific embodiments of the invention have been shown and described in detail to illustrate the application of the principles of the invention, it will be understood that the invention may be embodied otherwise without departing from such principles.

What is claimed is:

1. A holding device for fastening an add-on part to a support frame of a vehicle, the holding device comprising:
    an upper bracket fastened to the support frame in a mounted state of the holding device;
    a lower bracket separate from the upper bracket and selectively fastened to the support frame below the upper bracket in the mounted state of the holding device, the upper bracket and the lower bracket being designed as identical parts, the upper and lower brackets being fastened to the support frame in angular positions rotated by 180° from each other in a mounted state of the holding device;
    a holder fastened to the add-on part in the mounted state of the holding device, wherein:
    the holder has a hook, the upper bracket having a hook mount shaped complementarily to the hook, the hook mount receiving the hook with the hook being hung from a top;
    the holder has a fixing plate;
    the lower bracket has a plate mount shaped complementarily to the fixing plate and into which the fixing plate can be inserted; and
    a positive-locking connection, which secures the fixing plate at right angles to a direction of insertion in the plate mount, is formed between the plate mount and the fixing plate inserted into the plate mount.

2. A holding device in accordance with claim 1, wherein the hook has a lead-in bevel, which drives the hook when the hook is being hung into the hook mount against the upper bracket.

3. A holding device in accordance with claim 2, wherein the hook mount has a ramp complementary to the lead-in bevel.

4. A holding device in accordance with claim 1, wherein
    the hook has a plate section at an end facing the upper bracket;
    the upper bracket has a plate mount, which is shaped complementarily to the plate section and into which the plate section can be inserted from the top, on a side of the hook mount facing away from the holder; and
    a positive-locking connection, which secures the hook plate section at right angles to the direction of insertion in the upper bracket plate mount, is formed between the upper bracket plate mount and the hook plate section inserted into upper bracket plate mount.

5. A holding device in accordance with claim 4, wherein the fixing plate and the hook plate section are of a congruent shape.

6. A holding device at least in accordance with claim 4, wherein the plate section is chamfered in the direction of insertion.

7. A holding device in accordance with claim 1, wherein the holder has a web, which extends vertically in the mounted state of the holding device and which joins the hook downwardly and at which the fixing plate is arranged.

8. A holding device in accordance with claim 7, wherein at least one of the hook mount and the plate mount of the lower bracket and the upper bracket has a vertical slot, through which the web can be inserted and/or passed during mounting of the holding device.

9. A holding device in accordance with claim 7, wherein:
    the fixing plate is fastened to the holder;
    the holder has a plurality of fastening points for fastening the fixing plate, which have different distances from the hook; and
    the fastening points are formed on the web.

10. A holding device in accordance with claim 1, wherein the fixing plate is chamfered in the direction of insertion.

11. A holding device for fastening an add-on part to a support frame of a vehicle, the holding device comprising:
    an upper bracket fastened to the support frame in a mounted state of the holding device;
    a lower bracket fastened to the support frame below the upper bracket in the mounted state of the holding device;
    a holder fastened to the add-on part in the mounted state of the holding device, wherein:
    the holder has a hook, the upper bracket having a hook mount shaped complementarily to the hook, the hook mount receiving the hook with the hook being hung from a top;
    the holder has a fixing plate;
    the lower bracket has a plate mount shaped complementarily to the fixing plate and into which the fixing plate can be inserted; and
    a positive-locking connection, which secures the fixing plate at right angles to an insertion direction in the plate mount, is formed between the plate mount and the fixing plate inserted into the plate mount;
    a securing plate, wherein in the mounted state of the holding device, the securing plate extends over the hook against a direction of hanging and is fastened to the upper bracket in an area of the hook mount.

12. A holding device in accordance with claim 11, wherein the securing plate prestresses the hook in the direction of hanging.

13. A holding device fastening an add-on part to a support frame, the holding device comprising:
- a holder including a fastener attachable to the add-on part, said holder including a hook and a fixing plate;
- a first bracket including a fastener attachable to the support frame, said first bracket having a hook mount being shaped complementary to said hook to define a hook cavity, said hook mount being receivable of said hook in said hook cavity in an insertion direction;
- a second bracket separate from said first bracket, said second bracket including a fastener attachable to the support frame at a selectable position spaced from said first bracket, said second bracket having a plate mount being shaped complementary to said fixing plate to define a plate cavity, said plate mount being receivable of said fixing plate in said plate cavity in said insertion direction;
- said hook, said hook mount, said fixing plate and said plate mount being shaped to form a positive-locking connection between said holder and said first and second brackets in directions at right angles to said insertion direction when said hook is in said hook mount, and said fixing plate is in said plate mount, said hook and said fixing plate having different shapes, said plate mount having a shape to block said hook from being received by said plate mount, said first bracket and said second bracket having identical shapes, said hook mount being arranged on one side of said first and second brackets, said plate mount being arranged on another side of said first and second brackets.

14. A holding device in accordance with claim 13, wherein:
- said holder includes a plurality of fastening points at different distances from said hook;
- said fixing plate is selectively connectable to said holder at different ones of said plurality of fastening points to selectively position said fixing plate at variable distances from said hook.

15. A holding device fastening an add-on part to a support frame, the holding device comprising:
- a holder including a fastener attachable to the add-on part, said holder including a hook and a fixing plate;
- a first bracket including a fastener attachable to the support frame, said first bracket having a hook mount being shaped complementary to said hook to define a hook cavity, said hook mount being receivable of said hook in said hook cavity in an insertion direction;
- a second bracket separate from said first bracket, said second bracket including a fastener attachable to the support frame at a selectable position spaced from said first bracket, said second bracket having a plate mount being shaped complementary to said fixing plate to define a plate cavity, said plate mount being receivable of said fixing plate in said plate cavity in said insertion direction;
- said hook, said hook mount, said fixing plate and said plate mount being shaped to form a positive-locking connection between said holder and said first and second brackets in directions at right angles to said insertion direction when said hook is in said hook mount, and said fixing plate is in said plate mount, said holder including a web extending away in one dimension from the add-on part, and extending in another dimension along a line between said hook and said fixing plate, said fixing plate being mounted on said web, said hook mount and said plate mount defining a slot for receiving said web, said web and said slots of said first and second brackets being shaped for said web to slide through said slots in said insertion direction.

16. A holding device fastening an add-on part to a support frame, the holding device comprising:
- a holder including a fastener attachable to the add-on part, said holder including a hook and a fixing plate;
- a first bracket including a fastener attachable to the support frame, said first bracket having a hook mount being shaped complementary to said hook to define a hook cavity, said hook mount being receivable of said hook in said hook cavity in an insertion direction;
- a second bracket separate from said first bracket, said second bracket including a fastener attachable to the support frame at a selectable position spaced from said first bracket, said second bracket having a plate mount being shaped complementary to said fixing plate to define a plate cavity, said plate mount being receivable of said fixing plate in said plate cavity in said insertion direction;
- said hook, said hook mount, said fixing plate and said plate mount being shaped to form a positive-locking connection between said holder and said first and second brackets in directions at right angles to said insertion direction when said hook is in said hook mount, and said fixing plate is in said plate mount;
- a securing plate mountable on said hook mount and mountable over said hook to block removal of said hook from said hook mount.

* * * * *